United States Patent [19]

Goldstein

[11] 4,066,112

[45] Jan. 3, 1978

[54] AUTOMOBILE-TIRE SNOW CHAINS

[75] Inventor: Peter Goldstein, Lausanne, Switzerland

[73] Assignee: Vianette Goldstein, Switzerland

[21] Appl. No.: 694,947

[22] Filed: June 11, 1976

[30] Foreign Application Priority Data

June 13, 1975 Switzerland .......................... 7681/75
Dec. 16, 1975 Switzerland ...................... 16270/75

[51] Int. Cl.² .................. B60C 27/02; B60C 27/10
[52] U.S. Cl. ............................ 152/213 A; 152/219; 152/241
[58] Field of Search ............... 152/213 R, 213 A, 217, 152/218, 219, 239, 241

[56] References Cited

U.S. PATENT DOCUMENTS

| | | | |
|---|---|---|---|
| 1,434,111 | 10/1922 | Gause | 152/213 A |
| 1,672,019 | 6/1928 | Barber | 152/213 A |
| 2,130,293 | 9/1938 | Bonforte | 152/213 R |
| 2,275,994 | 3/1942 | Ruhkala | 152/219 |
| 2,537,392 | 1/1951 | Bettcher | 152/241 |
| 3,884,283 | 5/1975 | Engel | 152/213 A |

*Primary Examiner*—Drayton E. Hoffman
*Attorney, Agent, or Firm*—Robert E. Burns; Emmanuel J. Lobato; Bruce L. Adams

[57] ABSTRACT

An automobile-tire snow chain comprises running chain sections connected between a closed outer annular maintaining chain and an open inner maintaining chain. A long chain section is connected at one end to a first ring on one end of the inner chain and is looped through a second ring on the other end of the inner chain and through the first ring, so that the inner chain can be closed by pulling on the long chain section to tighten the loop. This long chain section includes a running chain portion which passes over the tire and is secured to a buckle on the outer annular chain, the free end of the long chain section being threaded about the outer annular chain and secured by a tensioning spring and a buckle.

5 Claims, 4 Drawing Figures

AUTOMOBILE-TIRE SNOW CHAINS

BACKGROUND OF THE INVENTION

The invention concerns automobile-tire snow chains, specifically those of the type comprising running chain-sections arranged to pass over a running band of a tire and being connected, on one side, to a closed annular maintaining chain and, on the other side, to an open annular maintaining chain, and a securing and tensioning device.

Various snow chains of this type are known, but they cannot be fitted from the outside of an automobile wheel without the user laying under the automobile to fix elements disposed on the inside of the wheel.

Another construction, proposed in Swiss Pat. No. 435002, consisted of having running chain sections connected on either side to open annular maintaining chains, and a long fixing chain fixed to one end of the inner open annular maintaining chain, this fixing chain passing through a ring on the other inner open annular maintaining chain and a ring on an end of the outer annular maintaining chain, and its free end being secured by an elastic tensioning device. This construction however did not prove successful, presumably because when driving with the chain fitted the rings tend to move so that the chain loosens and may even fall off the tire. Also, fitting this chain required a high degree of skill and practice to pass the fixing chain through the rings on opposite sides of the tire.

The invention aims to provide a snow chain of the first-mentioned type with an improved securing and tensioning device which avoids the mentioned drawbacks.

SUMMARY OF THE INVENTION

According to the invention, the securing and tensioning device of such a snow chain comprises a long chain section having a first end connected to an end of the opening maintaining chain and extending to a free end carrying a hooking device, the ends of the open maintaining chain having two return members through which the long chain section is passed to form a loop connecting said ends of the open maintaining chain, which loop can be tightened by pulling on the long chain section to close the open maintaining chain, said long chain section having adjacent its first end a portion which, after the open maintaining chain has been closed by tightening said loop when the snow chain is fitted on a tire passes over the running band of the tire and forms an additional running chain section, the free end of the long chain section being held by securement of said hooking device.

The use of a double return device, for example rings on the ends of the open annular maintaining chain, through which the long chain section is passed to form a loop, ensures a firm closure and holding of the open annular maintaining chain on the inside of a tire, whereas the closed annular maintaining chain disposed on the outside of the tire can be firmly held by tensioning it for example by threading the free end of the long chain section about it.

An embodiment of the invention is shown, by way of example, in the accompanying drawings, in which.

Figure 1:
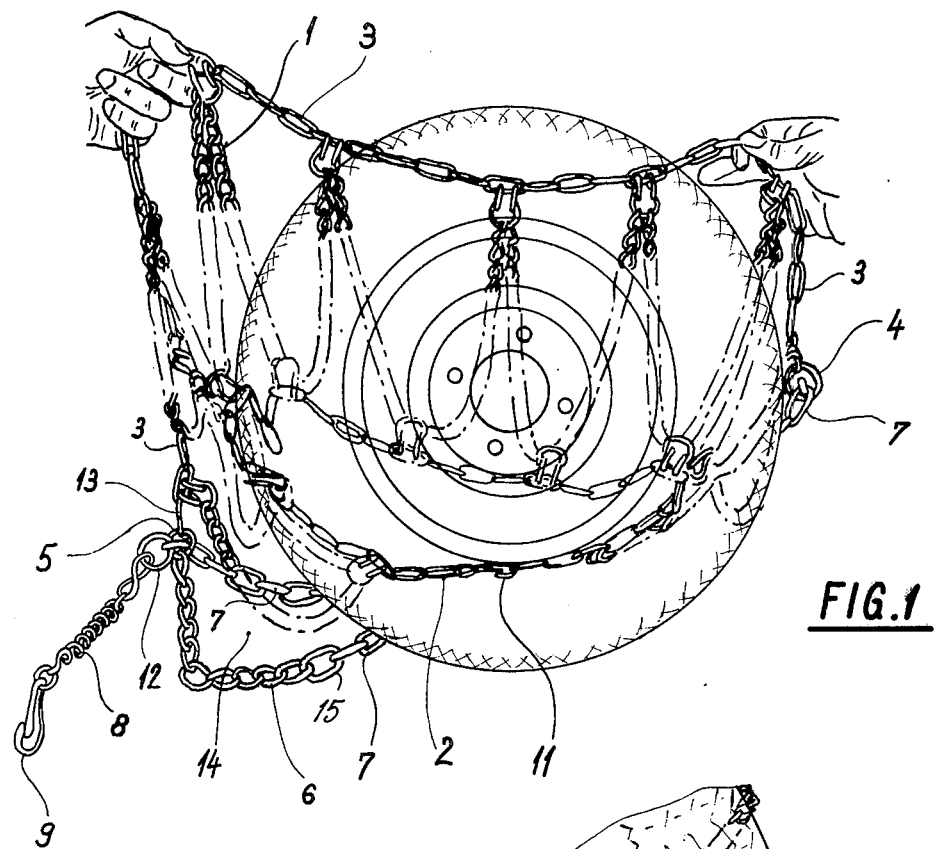
FIG. 1 shows a chain being fitted on a wheel and tire, from the outside of the wheel.

The snow chain shown comprises a series of "running" chain-sections or tread chains 1 of tempered steel connected between a closed annular maintaining or side chain 2 and an open annular maintaining or side chain 3. In the illustrated example, the running chain sections 1 are arranged to pass in zig-zag formation over the running band or tread of a tire, but they could have other known configurations, such as ladder formation or criss-cross. At each end open maintaining of the chain 3 a ring 4, 5 is secured to this chain. To the ring 5 is connected one end of a special running chain-section 6 of tempered steel whose other end is 15 extended by a long fixing and securing chain 7. The special running and securing chain 6/7 passes through ring 4, which forms a first return device, and through ring 5, which forms a second return device, so as to form a loop 14 which can be tightened by pulling on the chain 7 to pull the rings 4 and 5 together and hence close the chain 3. At its free end, chain 7 has a stop ring 12 having a greater outer diameter than the inner diameter of ring 5 to prevent the chain 7 from escaping from ring 5, so that the loop 14 is a permanent one. To the stop ring 12 is fixed a tensioning spring 8 fitted at its free end with a snap-hook or spring buckle 9. In the illustrated embodiment, ring 5 is removably attached to its end of open maintaining chain 3 by a snap-hook or spring buckle 13, but as a variation the ring 5 could be permanently fixed to its end of chain 3.

The manner of fitting the chain to an automobile tyre is shown in the drawings.

The first phase of fitting can take place in two manners, according to whether or not ring 5 is removably attached to chain 3. If the ring 5 is permanently fixed to chain 3, or if the user chooses to keep the ring attached to buckle 13, the snow chain is placed on the ground in a manner to form a layed-out loop between the chain 3 and the chain 6/7 whose two strands which form the tensioning loop 14 are placed side-by-side. Then the vehicle is moved to run the wheel into this layed-out loop with the chain 6/7 disposed on the inside of the wheel. If, instead, the user detaches the ring 5 from buckle 13, this initial part of fitting can be achieved, without moving the vehicle, by throwing the chain 6/7 with ring 5, spring 8 and buckle 9 behind the wheel, and then attaching the ring 5 to the buckle 13 which he passes around the wheel.

Next, as shown in FIG. 1, the user lifts up the open maintaining chain 3 with both hands and places it over the tire so that the running chain-sections 1 come to fit over the running tread, while the closed annular chain 2 remains on the outer side-wall of the tire.

Figure 2:
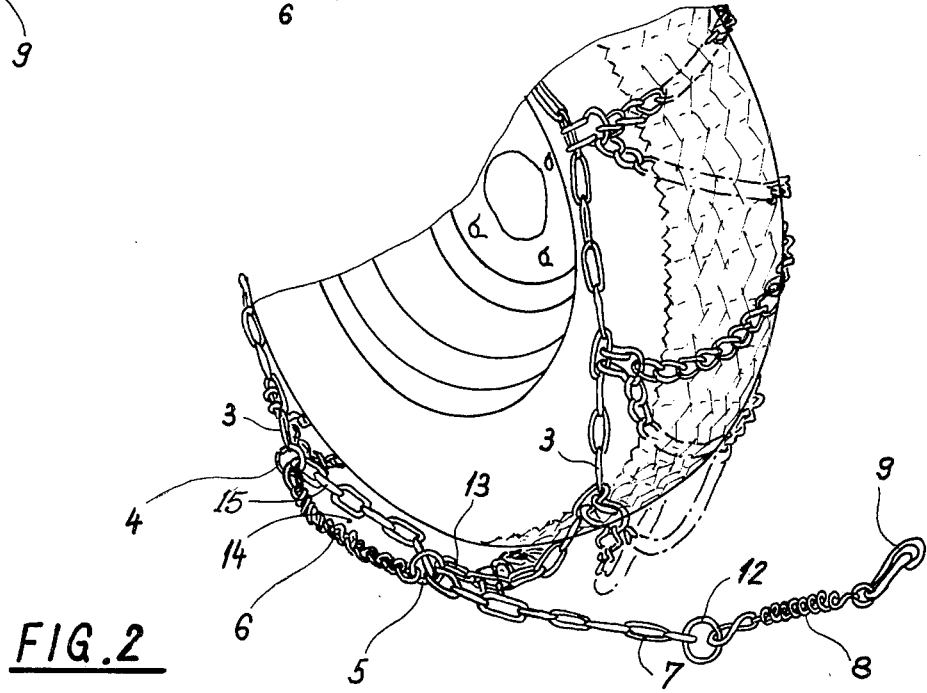
FIG. 2 shows a subsequent phase of fitting of the chain, viewed from the inside of the wheel.
Figure 3:
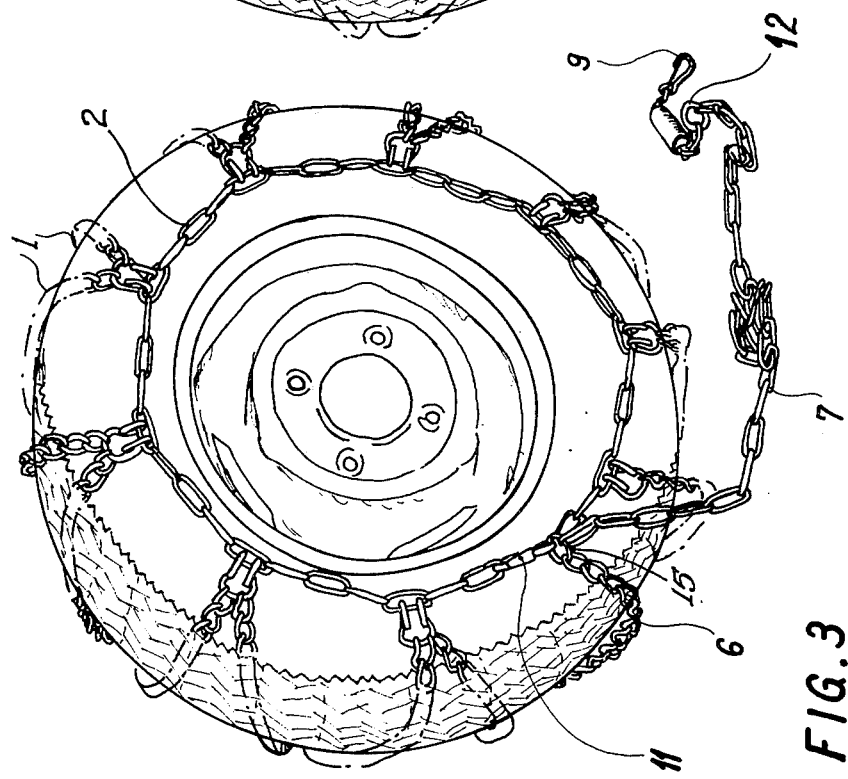
FIG. 3 shows another phase of fitting of the chain, viewed from the outside of the wheel.

Next, as shown in FIG. 2, the chain 7 is pulled to tighten the loop 14 until the rings 4, 5 are pulled together and the special running chain-section 6 has passed through the rings 4 and 5. The vehicle is then moved slightly, to free the part of the tire tread that previously rested on the ground, so that the special running chain-section 6 can be placed across this part of the tire and one of its links is secured to a buckle 11 on the closed, outer maintaining chain 2, as shown in FIG. 3.

Figure 4:
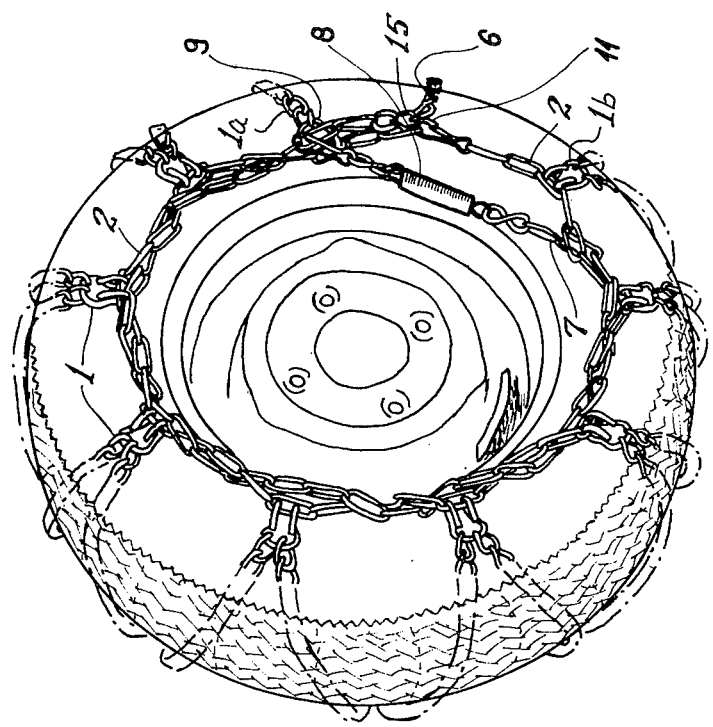
FIG. 4 shows the fitted chain from the outside of the wheel.

Finally, the chain 7 is threaded about the closed, outer annular maintaining chain 2 as shown in FIG. 4, and the assembly is tightened by fixing the buckle 9 to a link of chain 2 with the spring 8 under tension. As best shown in this figure, the running chain sections 1, in the use of the tire, are uniformly angularly spaced apart, circumferentially of the tire, and the special running section 6 is similarly spaced from the last two (1a, 1b) of the running chain sections.

The described tire chain has several advantages. It is not prone to tangling, and can be readily brought from a piled state to its configuration for use simply by pulling on the ends 4, 5 of the open annular maintaining chain 3. It can be fitted solely from the outside of the wheel, without a need to lie under the vehicle.

It can also be fitted to a tire of a stationary automobile, without a need to jack-up or move the automobile, which can thus be freed if it is stuck in snow. In effect, the inner annular maintaining chain 3 is firmly held closed by a self-locking action when the loop 14 has been tightened, and the special running chain section 6 and the chain 7 can be temporarily secured until the automobile has been freed by its own tractive force transmitted by the temporarily-held chains. Then the chain section 6 and chain 7 can be properly secured if required.

There is no fixing device or hook on the part of the chain disposed on the inside of the wheel, apart from the optional buckle 13. When this buckle is provided, the manner in which the chain is initially mounted can be chosen according to the conditions. The special running chain-section 6 of tempered steel passes accross the entire running tread. This special chain section is thus incorporated in both the tractive part of the chain, and in its securing device. Finally, because of the self-locking action of the tightened loop 14 on the ends of the chain 3, the chains remain satisfactorily in place when driving with them fitted.

It may be noted that the plain, circular rings 4 and 5, illustrated in the drawing can be replaced by other double return devices. Notably, one of the rings could be replaced by a ratchet loop or link providing a very safe locking.

Also, the term "chain" as used herein is intended to signify not only the usual and illustrated, elongate assemblies of interconnected links, but all usual equivalents used in tire "chains". In particular, the non-running parts such as the closed and open rings 2 and 3 and the section 7 could be in the form of cables.

What is claimed is:
1. An automobile tire snow chain, comprising;
   an open side chain for one side of a tire, the chain having two ends;
   a closed side chain for the other side of the tire;
   a series of several tread chains connected to the side chains and uniformly angularly spaced apart along the open side chain, in use; and
   a combined special tread chain and chain-securing device, comprising an additional chain having a first end connected to one of the ends of the open side chain and having a hooking device at a second and free end of the additional chain, the additional chain passing through the other end of the open side chain and also through said one end thereof to provide a loop connecting the ends of the open side chain which loop can be tightened by pulling the free end of the additional chain to close the open side chain, and the additional chain having, adjacent and extending from said one end thereof, a chain portion which in use passes over the tread of the tire providing a special tread chain circumferentially spaced from adjacent ones of the several tread chains, the free end of the additional chain being held, by securement of the hooking device, to the closed side chain;
   whereby the several tread chains and the special tread chain portion of the additional chain are uniform tractive elements on the tire.

2. A snow chain according to claim 1, wherein one end of the open side chain includes a ring connected to said one end of the additional chain and through which the additional chain passes.

3. A snow chain according to claim 2, in which the ring is removably connected to one end of the open side chain.

4. A snow chain according to claim 2, in which the additional chain has, adjacent its free end, a stop member large enough to prevent it from passing through the ring.

5. A snow chain according to claim 1, in which the open side chain has a member for removably securing the one end of the additional chain to the open side chain.

* * * * *